Oct. 22, 1935.  H. H. WELCH  2,018,390

ANIMAL SYMBOL

Filed Oct. 5, 1933

INVENTOR
Horace H. Welch
BY
Philip Farnsworth
ATTORNEY

Patented Oct. 22, 1935

2,018,390

UNITED STATES PATENT OFFICE 2,018,390

ANIMAL SYMBOL

Horace H. Welch, New York, N. Y.

Application October 5, 1933, Serial No. 692,353

20 Claims. (Cl. 46—40)

This invention relates to animal symbols as articles of manufacture, and consists of a representation, model or figure of any animal and its heart, preferably of a species recognized as having mental characteristics symbolized by the heart of the animal, as a good heart, figuratively referring to an agreeable or amiable disposition, such as a dog or horse having affection for or loyalty to human beings, or as an evil heart, referring to a vicious or wicked temperament, such as a villainous man or one of the bad cat genus as a leopard.

According to the invention, the body of the figure representing the animal preferably is more or less transparent, at least in part, providing for vision of its interior where means are provided internally of the body, to simulate the heart of the animal, as for example a member located in generally the correct or conventional position, physiologically, in the body, said member being given, in and of itself, one or more physical characteristics simulating the heart, such as a more or less correct or conventional heart-shape, or a color either truly representing the heart or symbolically representing the mental characteristics of the animal represented by the body of the figure, the heart when colored preferably having a color, shade, tint or hue different from the body of the figure, thereby increasing visibility of the interior heart-element as the heart of the animal located in the interior of the body of the figure representing the animal, or the heart having a roughened surface to increase its visibility; or any two or more or all of such characteristics of said heart member.

The uses of this animal symbol are very numerous and include among others, in general, including toys, paper-weights, ash-trays, pen-and-ink sets, mantel ornaments, statuettes, dolls, religious symbols and idols including Buddha statuettes, and, in smaller sizes, jewelry in the form of pendants, bracelets, etc., etc.

No particular size of the body of the figure is necessary, but usually, it is contemplated, the representation or model will be of the order of only a few inches in horizontal length, and much smaller than that when used as jewelry. But the figure may be much larger than a few inches as girls' dolls.

Figure 1:
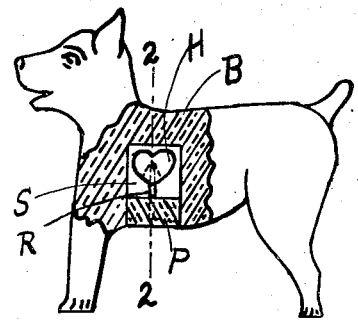
Figure 9:
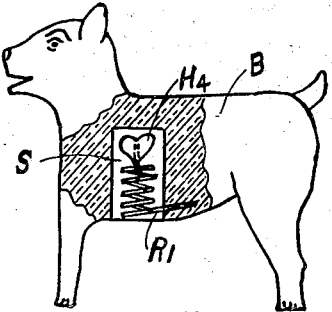
Figure 8:
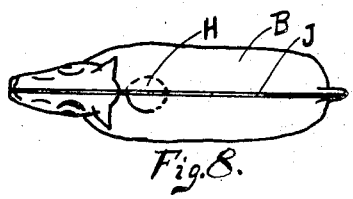
Figure 2:
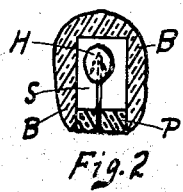
Figure 3:
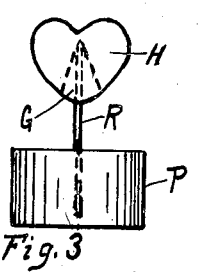
Figure 5:
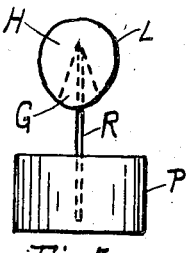
Figure 6:
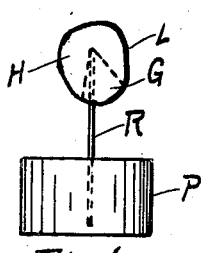
Figure 4:
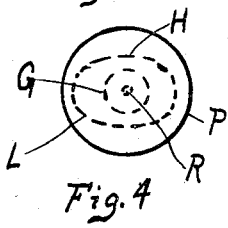
Figure 7:
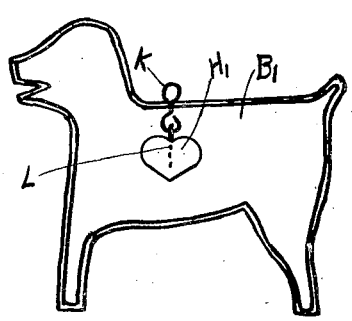

In order to provide a definite concrete showing of a few of the almost innumerable ways in which the invention can be constructed, the drawing is submitted, wherein Figs. 1-6 show one form, Fig. 1 being a side elevation of the animal symbol, as a figure representing a dog, partly in section to show the enclosed heart-member in elevation, Fig. 2 being a transverse section at 2—2, Fig. 1, showing the heart-member in elevation, Fig. 3 being an elevation of the means in Figs. 1-2 for movably supporting the heart-member, showing the heart-member in its position of rest, Fig. 4 being a bottom plan of Fig. 3, and Figs. 5 and 6 being views like Fig. 3 but showing the heart-member in different positions in its generally pseudo-pulsating movement, Fig. 7 is an elevation of a figure-member for a second form, Fig. 8 is a plan of the form of Fig. 7, Fig. 9 is an elevation, partly in section, of a form like Figs. 1-6, but illustrating a modified form of movable mounting of the heart-member on the body-member.

Figs. 1-6 and 9 illustrate that one of the various forms of the invention wherein the figure, B, representing the body of an animal, is cast and/or pressed in one part, with an interior space S opening to the outside, (but preferably normally closed), the casting being effected in any desired manner in accord with the general casting or pressing arts, such as in the die-casting of synthetic resins, etc.

Figs. 1-6 also illustrate the heart-means, in general, as at H, as a member separate from the animal figure or body B, but supported thereby in a manner providing for movements of the heart-means relative to the figure.

Figs. 1-6 also illustrate the heart-means H as movable and mounted in a normal state of balance whereby a slight movement of the figure B will cause, readily, an unbalancing and a marked or easily observable pseudo-pulsating movement of the heart which emphasizes the presence of the heart-means and its appearance as a heart, inside the figure.

Figs. 1-6 also illustrate that one of the various forms of the invention wherein the heart-means H not only is movable but is mounted for pseudo-pulsating movements of wide amplitude, inside figure B, so that its pseudo-pulsations will continue for a substantial period of time after having been initiated by an impulse caused as by a movement of the figure, or initiated by a force applied directly to the relatively movable heart-means in forms where the latter is accessible to such force as thru a lateral opening in figure B in Fig. 1.

Figs. 1-6 also illustrate that one of the various forms of the invention wherein the body of the figure B, by its shape, or its shape and color, or its shape including simulation of hair or fur, or clothing (in cases of human animals), represents any desired animal, the body and the heart preferably being of contrasting coloration to increase or emphasize the presence and appearance of the heart-means as the heart of an animal inside its body, the color of the body also permissibly truly representing the body or clothing of the animal (as of a man or woman) and the color of the heart symbolizing a temperament, disposition or mental character of the animal represented by the body of the figure, whether human or one of the lower animals.

In Figs. 1-6 the interior space S is shown as large enough to provide for the freedom of pseudo-pulsating movement of heart H which is provided for by the heart-supporting means for example P, R. The space S inside figure B opens to the outside thru the chest of the figure of the four-footed animal, (either in the location shown, or nearer the neck), and the heart-mounting means in this particular form includes a plug or closure P closing said opening, the plug being of any desired material, as the same such as the figure, or permissively either more or less transparent, or opaque, and secured in its position closing the opening to space S in any known or convenient manner, as by cementing or welding or hinging, etc., so that the closure P becomes a portion of the figure B, the particular method of consolidating the plug P and figure being dependent on the nature of the materials of parts B and P. In the upper portion of part P is fixed a small rod or wire or pin R, which may be stiff, of needle shape and of a length extending into space S when plug P is in its closing position, the upwardly extending end of pin R being pointed. The heart H is formed with a conical or segment space G, Figs. 3-6, having its apex more or less above the center of gravity of the heart, not merely to maintain position of the heart, but to provide for pulsation, simulating movement of the animal's heart. The pointed upper end of rod R bears in the apex of conical or segment space G so as to provide a delicately balanced mounting for the heart, providing for initiation of pseudo-pulsating movement of the heart by very slight movements of figure B. Also segment space G is such that it can be made so wide below its apex, relative to the diameter of pin R, that the heart-movement on the pin-point can be of wide amplitude as indicated in Fig. 6. Space S in figure B is large enough to permit such movements, i. e., larger than heart H. The upper wall of space S, after assembly of the parts, keeps heart H from falling off its mounting on top of wire or rod R, if and when the figure B is inverted. If desired, rod or wire R in Fig. 1 may be of spring-wire, providing for motion of H whether or not it is mounted relatively movable to R. See also Fig. 9.

To the extent that the portion of support R on which heart H is mounted, is sharp, (i. e., of small frictional area of relatively moving parts), to that extent will the heart be more delicately balanced. Such sharpness of mounting, for delicate balance, and in forms for desirably wide amplitude of movement simulating heart-pulsation, can be obtained by various means, including two parallel members R, or a knife-edge of the portion of support R on which heart H is mounted. The door, preferably of more or less transparent material, (which closes an opening in body B in Fig. 1, thru which opening in this figure, heart H may be visible directly), is, when used, hinged in any well known manner to the adjacent portion of body B, or the door when used, may carry any desired heart-supporting means, as R; or the door may be omitted entirely and space S left open to outside, in Fig. 1, providing for direct vision of heart H; or plug P may be hinged to body B; and in any case when a hinged or other removable closure is employed (transparent or not), and carries the heart-means, thereby access is provided to said means for initiating the pseudo heart-pulsation directly on the heart-means without need of moving or jarring body B, altho usually reliance is placed on moving body B for the purpose of initiating the heart-pulsating effect by a movably-mounted heart-member, Figs. 1 and 9. Usually and preferably the movements of the heart means H are limited to the interior of the body B, the body completely housing the heart-means, and the latter is located well within the inside of the body; but it is permissible for the heart-means to extend to the outside of the body, at least in its movements, particularly if such extending portion be at a portion of the body where the extending portion of the heart-means otherwise is less prominently visible. For example, in the case of a figure representing a human being, as for a mantel ornament, wherein the body has a chest portion more or less transparent thru which the heart-means appears from the front of the figure, a portion of the heart-means can extend beyond the back of the figure, thru a permanent rear opening, the heart-means if movable, being mounted in an interior body-space S for desired movement; and in any such case, i. e., of an animal standing upright, the closure P, whether permanently closing the outside opening to the interior body-space S as by being welded or cemented to the rest of body B, or hinged to the body, can be located at such outside opening at the back of the body. In any case, of an animal standing upright, only the material of the chest may be transparent more or less, providing for appearance of the heart means from only the front of the body; or the material entirely around the body, in the horizontal zone of the heart-means, can be made transparent so that the heart-means may appear from all sides of the body. Thus, the body may be constructed conveniently of transverse halves, one including the head, arms, or fore-legs, and the thorax and contained heart-simulating means (this half being wholly of material, as glass, more or less transparent), and the other half including the rest of the body and being wholly of opaque material, as wood, and united, as by cementing, etc., to the other half at more or less the "waist-line", so to speak, of the body. The above is believed to be sufficient to indicate to those desiring to use the invention, the fact that it can be constructed in a very great variety of forms all embodying the fundamental feature, in an article of manufacture for any desired use, of a figure representing an animal body including heart-simulating means inside the figure but appearing from outside the figure as the heart of an animal inside its body of which the figure is a representation; all without need of accurate representation of the true proportionate size or shape or location or color of the heart of the animal represented by the figure.

Representative figure or body B, instead of being made in one part, as in Figs. 1-6, may be formed of two cast, stamped or pressed thin-material, hollow members B1, as of celluloid, duplicating Fig. 7. The heart-supporting means in Fig. 7 here is one adapted for use of the device in jewelry, and includes a stiff wire K bent into eyes at top and bottom. Another wire L is bent into an eye engaging the lower eye of wire K, and the other portion of wire L is cemented in heart H1. Thus the heart can swing back and forth freely. As a jewel, a suspending chain can be attached to the upper eye of wire K. The generally duplicate (left-right) hollow members as B1 in Fig. 7 may be joined together as at J, Fig. 8, the space S inside the figure B being in Fig. 8 the entire hollow of the figure inside the walls of duplicate members which are thin in contrast with the bulk of the figure B in Figs. 1-6.

Fig. 9 shows a form similar to Figs. 1-6 wherein the heart-supporting member is a wire spring R1, one end of which extends into and is fixed to the heart H4, but the other end of R1 is fixed immovably to the figure B, the opening from space S to the outside being shown as left open at the breast of the quadruped. This is a good form, providing for a desirable movement of the heart-member by the spring R1, and of low cost.

In any form of the invention, the body B may consist of, or include, at least in the vicinity of the heart H, any more or less transparent material such as glass, pigmented or not, which will provide for vision of the heart from outside the body B; but any materials other than glass may be employed for the body, having the translucent or transparent property of glass, including the synthetic resins, transparent plastics, transparent papier-mâché, etc., etc., and materials of similar translucency or greater or less transparency providing for vision of the internal heart-simulating means H as a pulsating heart from outside the figure, all pursuant to the knowledge of those skilled in the art of transparent or translucent or pigmented materials. And the heart-simulating means H may be made of any desired material, even wood, glass, or metal etc., etc., but preferably colored (or black) contrastingly with the body B, to provide for its clearness of vision as a pulsating heart thru the more or less transparent, and differently colored or colorless body, or thru an opening in the body.

Herein, when the body B is characterized as of transparent material, that refers more particularly to the material of the body which is in the vicinity of the heart H, namely, the material of the body lying between the heart and the observer; that is, the entire body B need not be transparent, parts of it other than between the heart and the observer being permissibly quite opaque. And the word transparent herein is used to mean, not necessarily altho permissively perfectly transparent, but more or less so, as partially transparent or translucent, i. e. sufficiently transparent to provide for desirable appearance, thru the body, with higher or lower visibility, as may be desired in any case, of the heart-simulating means as a pulsating heart located inside the body; for it is to be understood that this heart-simulating means, when as preferred of a color contrasting with the body, can be seen sufficiently clearly thru the body, especially when the heart-member is in motion, even if the material of the body in the vicinity of the heart be not perfectly but only moderately transparent. A good form, however, is when the body is perfectly transparent and the heart-simulating means is colored in contrast with the body. In an inferior form of the invention, the heart-simulating means internally of the body may be directly visible also thru an opening in a body B not transparent at all.

In some cases it is preferable to have the body not perfectly transparent, but only partially so, as when it is desired to impress on the observer, by way of vision thru the material of the body, the fact that the heart is located well within the interior of the body. A lower order of transparency of the body enhances that impression. Yet it is an object of the invention to cause the heart-means to be prominently visible as a heart, even in such cases.

Among the various advantages of the invention is the fact that it is practicable to provide a color for the heart-means causing the latter to symbolize the temperament, disposition or mental condition or constitution of the animal, human or of lower order of genera. But when such symbolism is not desired, however, the heart-means need have no particular color at all, altho it always is desirable to give it a striking coloration to improve its visibility, or at least a differently appearing surface than body B, and preferably a coloration different from that of the body, (especially when the material of the body is only partially transparent) for the purpose of creating the visual impression of a remote location of the heart-means deep in the interior of the figure, to represent the actual location of an animal's heart inside its body. The invention involves the plain visibility of the heart-means inside the figure, as a fact different from the in-visibility of an animal's heart inside its body; but yet, in the best forms of the invention, the heart-means is not exposed directly to the eye. The interposition of more or less transparent material of the figure representing the animal's body, which material is not perfectly transparent, to that extent reduces the desired plain visibility of the heart-means. Yet interposition of such body-material is preferable because it desirably reduces the unnaturalness of visibility of a functioning heart. Hence the preference for the invention in a form wherein not only is the figure-material only partially transparent, but there is contrasting appearance of the structure of figure B and heart-means H, preferably by means of coloration, because such contrasting appearance increases the desirable plain visibility of the heart-means without correspondingly destroying the utility of the only partially transparent figure-material in reducing the unnaturalness of visibility of a functioning heart. As above, however, the invention goes beyond the simulation by the heart-means of the physical conditions involving the heart of the animal, and has as an important object the use of the heart-means in a manner symbolizing the mental attributes of the animal represented by the figure. Thus, when the heart-means is colored, for example, red, black, green, yellow, or white, the figure B in each such case preferably is either colorless or of a different color, shade, tint or hue, for the purpose of enhancing simulation of the appearance of the heart-means as a physical element of the animal, by increasing the visibility of the heart means thru the transparent (but preferably not too transparent) figure, by increasing the contrasting appearance of figure and heart-means; and said respective colors of the figure and heart-means, in connection with the other features simulating the heart of the animal, establish the symbolism of the invention based on the fact that it is common in speaking of the mental characteristics of a person or even of the lower animals, to refer to the heart, such as to speak of a villain as black-hearted, or of a strong, brave, good, loyal or friendly person or lower animal as red-blooded or warm-hearted, etc., etc., and such symbolism being based on the fact that various colors are spoken of as symbolizing mental conditions, as green for jealousy, yellow for cowardice, white for purity, etc., so that according to the invention a red coloration of the heart-means (preferably contrasting with a different color of the figure), symbolizes the heart, for example, of an animal loyal and friendly to man, as a dog; a black coloration of the heart-means (preferably contrasting with the color of the figure), symbolizes a villainous or "black-hearted" animal; a green coloration of heart-means (preferably contrasting with the color of the figure), symbolizes a jealous mental attitude; a yellow coloration of the heart-means (preferably contrasting with the color of the figure), symbolizes a cowardly-hearted animal; and a white coloration of the heart (preferably contrasting with the color of the figure), symbolizes a "pure-hearted" individual, etc. Thus, to indicate the field of symbolism permissively involved in the contrasting coloration of figure and heart which contrast is provided primarily to simulate a physical heart providing plain contrast between figure and heart-means in the interior of the transparent body, consider the figure of an angel in the shape and dress of the female of the human animal, wherein white and sky-blue might constitute the structural contrasting coloration, the sky-blue for the robe-simulating portion of the figure representing the angel, to symbolize heavenly origin, and the white for the heart to symbolize purity of the mind of the angel. Similarly, the figure may be clothed in the garments of a member of a church sister-hood, the clothing being black and the heart white or red. This last example is one of a class, as in the case of the red devil where the color of the figure which includes representation of the body-covering (as the attire of a person) may be symbolic, and this may be so whether or not the color of the heart-means is symbolic, just as a color for the heart-means may be symbolic even if the color of the figure be not symbolic. In any case, the heart-means may be red solely for the purpose of simulating the physical appearance of an animal's heart, and in such case, when the heart-member is located more or less within the breast of the figure, and of much smaller size than even the miniature figure, the feature of a heart-simulating shape of the heart-means is of less importance. Also, in providing the contrasting coloration between figure and heart-means, the color or colors adapted for the former representing the animal's body may be truly representative of the appearance of the body of any particular animal, as brown for a brown bear, etc. It is to be understood that the coloration of the more or less transparent portion of the figure B between the observer and the heart-means, may be obtained in any desired manner, as by pigmentation of the material as well known, so that the transparency may be amply sufficient; and that the contrasting coloration may be present when the heart-means but not the figure is colored and vice versa; and that no contrasting coloration of figure or heart is necessary, nor any coloration of the heart even if the figure be colored, altho in all cases it is greatly preferred that at least the heart-means be colored, and preferred that figure B and heart-means be contrastingly colored. And while the figure may be perfectly transparent, it is greatly preferred that it be less than perfectly transparent and that it be colored, including the portion between the heart-means and the observer. It also is greatly preferred that the material of the figure B shall intervene between the heart-means and the observer (and then of course be more or less transparent) rather than that the heart means inside the figure be visible directly, because the simulation of a heart by the heart-means is enhanced by the visibility of an intervening figure-portion, and yet further enhanced by a lack of perfect transparency of the figure-material, by giving the impression of a deeply interior location of the heart inside the body no matter how well and clearly the heart-means itself by its construction and location, simulates the animal-heart itself. That is, in an ideal embodiment of the invention the heart-means is concealed within the figure to the greatest extent consistent with the plain visibility of the heart-means from outside the body; and this illustrates the practical value of supporting the body for pseudo-pulsating movement inside the figure, because such movement does more than merely simulate heart-pulsation, but increases visibility of the heart means resulting from its movement which is especially desirable in the preferred case where the transparent figure material is so far from perfect transparency as to give the desired impression of heart-location deep inside the body, in which case the heart-means can not be as prominently visible as is desirable unless it be in motion. The above wide amplitude of motion of the heart-means is desirable for the same reason, i. e., increasing visibility, even altho it is an exaggeration of true heart-pulsation; such wide amplitude being useful also in prolonging the total time of movement. The delicacy of balance of mounting of the heart-means is useful not only in providing for initiation of movement by slight force, but in providing for longer total time of movement. Additional examples could be given here, but the above are believed to be sufficient to show the constructor how to obtain the desired optimum visibility of the heart in the interior of the animal body, not merely in the case of the dog illustrated in the drawing, but in the case of many other animals, namely living beings having hearts, and when desired, in a manner symbolic in various respects of any one of various mental characteristics of various genera, species or individuals in the animal kingdom, with or without coloration of the figure appropriate to the skin, fur or dress of the animal represented by the figure.

I claim:

1. The article of manufacture which consists of a body-member having a shape representing in miniature the body of an animal, said member being formed with an interior housing-space, in combination with a member separate from the miniature body-member and simulating the heart of the animal represented by the body member and located inside said body-member in said housing space; said space being larger than the heart-member and the heart-member being carried by the body-member in movable relation therewith providing for pseudo-pulsating movements of the heart-member in the larger heart-housing space; and the miniature body-member, between the eye of an observer and the heart-member, consisting of material sufficiently transparent to provide visibility of the pulsating movements of the interior heart-member in its housing space.

2. The article of manufacture which consists of a body-member having a shape representing in miniature the body of an animal, said member being formed with an interior housing-space in visual communication with the exterior, in combination with a member separate from the miniature body-member and simulating the heart of the animal represented by the body member and located inside said body-member in said housing-space; said heart-housing space being larger than the heart-member and the heart-member being carried by the body-member in movable relation therewith providing for pseudo-pulsating movements of the heart-member in the larger housing-space, said movements increasing the visual impression on an observer of the space, of the heart-member as the heart of the animal represented by the body-member.

3. The invention according to claim 2 wherein the body-member includes a plurality of more or less hollowed thin-walled portions secured together at their walls forming the body-member having the interior housing space receiving the pulsating heart-member.

4. The invention according to claim 2 wherein the heart-simulating member internally of the body-member is supported for pseudo-pulsating movement in a balanced state readily unbalanced to initiate pulsation.

5. The invention according to claim 2 wherein the heart-simulating member is supported for freedom of pseudo-pulsating movements of wide amplitude and total time duration in the relatively large interior housing space.

6. The invention according to claim 2 wherein the heart-simulating member is mounted inside the relatively large housing-space in a balanced state and for freedom of pseudo-pulsating movements of wide amplitude and total time duration.

7. The article of manufacture including a body-member having a shape representing in miniature the body of an animal and formed with an interior housing space and an outside opening thereto, in combination with a closure for said opening forming a portion of the body-member, and with a member simulating an animal heart and separate from said body-member and supported by said closure for location in said housing-space inside the body-member; a portion of the body-member between said heart-simulating member and the eyes of an observer being of material sufficiently transparent to cause visibility of said heart member from outside the body-member to said heart-housing-space.

8. The invention according to claim 2 wherein the heart-simulating member is suspended in the interior housing space in balanced condition for pseudo-pulsating movement.

9. The invention according to claim 2 wherein the body-member consists of a plurality of separate members extending longitudinally thereof and of shapes forming between them when secured together, a housing space larger than the heart member, providing freedom for the pulsation of the heart member therein.

10. The invention according to claim 2 wherein the body-member consists of a plurality of separate members of shapes forming between them, when secured together, the housing space for the heart member.

11. The invention according to claim 7 wherein heart-carrying means is supported by the closure, said carrying means extends into the interior space of the body, and the heart-simulating member located in said interior housing space is supported by said heart-carrying means in said space.

12. The invention according to claim 2 wherein means is carried by the body-member for supporting the heart-member in position inside the housing space and said means is characterized by small area of contact between the relatively moving parts whereby the heart member is supported in condition for pseudo-pulsating movement as a heart and in condition readily unbalanced for initiation of pulsating movements.

13. The invention according to claim 2 wherein means is carried by the figure, said means to movably support the heart-member consisting of a wire.

14. The invention according to claim 2 wherein a heart-supporting member is carried by the body-member, and the separate heart-member inside the body-member is mounted on said supporting member.

15. The invention according to claim 2 wherein the heart-simulating means is supported above its center of gravity.

16. The invention according to claim 1 wherein the material of the body-member between the heart-member and the observer is only partially transparent thereby reducing the unnaturalness of visibility of heart-pulsation, and the heart member possesses a surface characteristic which is in contrast with the appearance of the material of the body-member thereby increasing visibility of the pulsating heart-member thru the only partially transparent figure-material.

17. The invention according to claim 1 wherein the heart-simulating means, in addition to its location and size relative to the figure, is formed in a shape recognizable more or less readily as a heart-shape, said shape emphasizing the impression on the observer of the outside of the figure, of a representation of the heart of the animal inside its body of the shape of which the figure is a representation.

18. The invention according to claim 1 wherein the material of the body member between the heart-simulating member and the observer is only partially transparent and thereby reduces the impression of unnaturalness of visibility of heart-pulsation, and wherein in addition to the location and proportion and pulsating mobility of the heart-simulating member relative to the body-member, the body-member and heart-member contrasting coloration increasing the visibility of pulsation of the heart-simulating means thru the only partially transparent figure-material, as a representation of the heart of the animal inside its body of the shape of which the body-member is a representation.

19. The invention according to claim 2 wherein the body-member is a representation of a four-footed animal, and the bottom of the body portion nearer the fore-quarters is formed with an opening to the interior heart-housing space.

20. The article of manufacture which includes a body-member having a shape representing in miniature the body of an animal and formed with an interior housing space, a wire supported by the body-member in position inside the housing-space; and a heart-simulating member supported by said wire also in position inside the housing space in an arrangement providing for pseudo-pulsation of the heart-member relative to the body-member; the body-member between the pulsating heart-member and the eye of an observer, consisting of material sufficiently transparent to provide visibility of the pulsating heart-member in the housing-space inside the body-member; and the heart-supporting wire providing small frictional area between the relatively moving parts thereby providing for ease of initiation of heart-pulsation and a long time of pulsation.

HORACE H. WELCH.